United States Patent [19]
Yamashita et al.

[11] 3,856,855
[45] Dec. 24, 1974

[54] PROCESS FOR PREPARATION OF NAPHTHALENE MONOCARBOXYLIC ACID OR NAPHTHALENE DICARBOXYLIC ACID

[75] Inventors: Gentaro Yamashita; Kiyoshi Yamamoto, both of Iwakuni, Japan

[73] Assignee: Teijin Limited, Osaka, Japan

[22] Filed: Feb. 10, 1971

[21] Appl. No.: 114,386

[30] Foreign Application Priority Data
Feb. 17, 1970 Japan.............................. 45-13569
Feb. 17, 1970 Japan.............................. 45-13571

[52] U.S. Cl............................................ 260/524 R
[51] Int. Cl... C07c 51/20, C07c 63/36, C07c 63/38
[58] Field of Search............................... 260/524 R

[56] References Cited
UNITED STATES PATENTS
2,833,816  5/1958  Saffer et al. ........................ 260/524

Primary Examiner—Lorraine A. Weinberger
Assistant Examiner—Richard D. Kelly
Attorney, Agent, or Firm—Sherman & Shalloway

[57] ABSTRACT

A process for the one-stage preparation of naphthalene monocarboxylic acid or naphthalene dicarboxylic acid which comprises oxidizing monomethylnaphthalene or dimethylnaphthalene in an acetic acid solvent with molecular oxygen in the presence of a three-component catalyst containing prescribed amounts of a cobalt compound, a manganese compound and a bromine compound. This process yields naphthalene mono- or di-carboxylic acids of less coloration at high conversion and high selectivity.

5 Claims, No Drawings

PROCESS FOR PREPARATION OF NAPHTHALENE MONOCARBOXYLIC ACID OR NAPHTHALENE DICARBOXYLIC ACID

This invention relates to a process for preparing naphthalene mono- or dicarboxylic acids by oxidizing mono- or di-methylnaphthalene with molecular oxygen.

More specifically, this invention relates to a process for the one-stage preparation of naphthalene monocarboxylic acid for naphthalene dicarboxylic acid which comprises oxidizing monomethylnaphthalene or dimethylnaphthalene in an acetic acid solvent with molecular oxygen in the presence of a three-component catalyst containing prescribed amounts of a cobalt compound, a manganese compound and a bromine compound.

Naphthalene monocarboxylic acid and naphthalene dicarboxylic acid are compounds useful as intermediates leading to various industrial chemicals, dyestuffs and the like. Naphthalene monocarboxylic acid and naphthalene dicarboxylic acid other than 2,6-naphthalene dicarboxylic acid can be readily converted to 2,6-naphthalene dicarboxylic acid by utilizing the Henckel rearrangement reaction. (see, for instance, specifications of U.S. Pat. No. 2,823,231 and U.S. Pat. No. 2,849,482).

Polyesters prepared from 2,6-naphthalene dicarboxylic acid and ethylene glycol have excellent heat resistance and mechanical properties as compared with polyethylene terephthalate, and films, fibers and other shaped articles prepared from such polyesters have recently attracted great attention in the art.

With regard to the preparation of naphthalene mono- or di-carboxylic acid, a method comprising oxidizing mono- or di-methylnaphthalene with use of a dichromate as an oxidant has been known. This method, however, is industrially disadvantageous because a peculiar and expensive oxidant must be employed.

Various methods have been proposed to prepare aromatic carboxylic acids by oxidizing aromatic compounds having an aliphatic substituent with molecular oxygen. For instance, a method of preparing aromatic carboxylic acids by employing as a catalyst a heavy metal and bromine (see the specification of U.S. Pat. No. 2,833,816) can be exemplified.

Such conventional method employing a heavy metal-bromine catalyst is applied with good results to the preparation of benzene carboxylic acids such as benzoic acid, terephthalic acid and isophthalic acid. However, even if this method is directly applied to the preparation of naphthalene mono- or di-carboxylic acids, it is difficult to obtain the intended carboxylic acid in high yields and, further, the resulting carboxylic acid tends to be colored yellowish brown to dark brown.

In general, an alkyl group bonded to the naphthalene ring is more difficultly oxidized than an alkyl group bonded to the benzene ring, while the naphthalene ring per se is more readily oxidized and cleavaged than the benzene ring. Accordingly, if the oxidation of mono- or di-methylnaphthalene is effected by employing an oxidation catalyst suitable for the oxidation of alkyl benzenes under the conventional conditions adopted in the oxidation of alkyl benzenes, naphthalene mono- or di-carboxylic acids cannot be obtained with sufficient results because the oxidation of the methyl group is insufficient, the cleavage of the naphthalene ring is extreme or the resulting oxidized product is colored.

The primary object of this invention is to provide a process which can give naphthalene mono- or di-carboxylic acids of less coloration at high conversion and high selectivity by oxidizing mono- or di-methylnaphthalene with molecular oxygen.

The secondary object of this invention is to provide a novel catalyst composition to be used for the above oxidation reaction.

Another object of this invention is to provide a process for the preparation of 2,6-naphthalene dicarboxylic acid of high purity and less coloration of oxidizing, 2,6-dimethylnaphthalene with molecular oxygen, particular with air.

Other objects and advantages of this invention will be apparent from the description given hereinbelow.

In accordance with this invention, naphthalene monocarboxylic acid or naphthalene dicarboxylic acid of high purity and less coloration can be manufactured at high conversion and high selectivity by a process comprising oxidizing monomethylnaphthalene or dimethylnaphthalene in an acetic acid solvent with molecular oxygen, wherein (1) acetic acid is used in an amount of at least 2.5 parts by weight per 1 part by weight of monoethylnaphthalene or dimethylnaphthalene, (2) a catalyst containing the following three components;

a. a cobalt compound soluble in the acetic acid solvent, b. a manganese compound soluble in the acetic acid solvent, and c. bromine or a bromine compound, in quantities meeting the following requirements;

$$3.0 \leq X + Y + Z \leq 10.0 \quad (1)$$

$$0.5 \leq Z/(X + Y) \leq 2.5 \quad (2)$$

and $$0.1 \leq X/Y \leq 10 \quad (3)$$

wherein

X indicates the amount of cobalt contained in the cobalt compound in terms of parts by weight per 100 parts by weight of mono- or di-methylnaphthalene, Y indicates the amount of manganese contained in the manganese compound in terms of parts by weight per 100 parts by weight of mono- or di-methylnaphthalene, and Z indicates the amount of the bromine or bromine contained in the bromine compound in terms of parts by weight per 100 parts by weight of mono- or di-methylnaphthalene, is present in the reaction system, (3) the oxidation temperature is maintained within a range of from 70° to 170°C., and (4) the oxygen partial pressure is maintained at a level not lower than 0.5 atmosphere (absolute pressure).

In this invention, it is particularly essential that the oxidation reaction should be conducted at a temperature within the above specific range with use of a catalyst of the above-mentioned specific composition while maintaining the oxygen partial pressure at the above-mentioned specific level.

This invention will now be detailed.

Starting Material

At least one member selected from mono- and di-methylnaphthalenes cited below may be used as the starting material in this invention. Examples of mono-methylnaphthalene:

1-methylnaphthalene and 2-methylnaphthalene. Examples of di-methylnaphthalene:

1,2-dimethylnaphthalene, 1,3-dimethylnaphthalene, 1,4-dimethylnaphthalene, 1,5-dimethylnaphthalene, 1,6-dimethylnaphthalene, 1,7-dimethylnaphthalene, 1,8-dimethylnaphthalene, 2,3-dimethylnaphthalene, 2,6-dimethylnaphthalene, and 2,7-dimethylnaphthalene.

In this invention, any of the above recited mono- and di-methylnaphthalenes may also be used, and mixtures of two or more of them may be also used as the starting material. Further, even if impurities such as naphthalene, diphenyl and trimethylnaphthalene are contained in the starting material, the presence of such impurities does not at all inhibit the progress of the intended oxidation reaction. Accordingly, in this invention there starting material may be used containing as the major component one or more mono- or di-methylnaphthalenes, such as a mixture of fractions boiling at 240° – 245°C or 255° – 265°C., which is obtained by rectifying, if required after hydrodesulfurization, a gas oil fraction obtained in the distillation of crude petroleum or a heavy oil obtained in the catalytic decomposition, catalytic modification or naphtha decomposition; and a fraction comprising as the major component one or more mono- or di-methylnaphthalenes, which is obtained from a tar portion recovered from coal tar or coal gas.

Solvent

The process of this invention is carried out in an acetic acid solvent. The acetic acid is used in an amount of at least 2.5 parts by weight, preferably at least 4 parts by weight, per 1 part by weight of mono- or di-methylnaphthalene. When the amount of acetic acid used is less than 2.5 parts by weight per 1 part by weight of mono- or di-methylnaphthalene, the catalyst does not exhibit any substantial activity and the oxidation reaction is not allowed to advance, with the result that the intended naphthalene mono- or di-carboxylic acid be obtained in high yields. In this invention, the upper limit of the amount of acetic acid used is not critical, but from the industrial viewpoint it is preferred that the amount used of acetic acid does not exceed 20 parts by weight per 1 part by weight of mono- or di-methylnaphthalene.

The presence of a small amount of water in the acetic acid solution is preferred, because it increases the solubility of the catalyst which will be detailed below. However, the presence of too great an amount of water in the acetic acid solvent inhibits the progress of the oxidation reaction intended in this invention. Further, in the oxidation reaction of this invention water is formed as by-product. Accordingly, it is preferred that the oxidation reaction of this invention is carried out while maintaining the water content of the acetic acid solvent at less than 20 percent by weight, especially less than 10 percent by weight. The presence of water is not particularly necessary, but it is especially desired that the acetic acid solvent contains water in an amount of about 0.5 to about 5 percent by weight. In the foregoing explanation, the water content is one inclusive of crystal water contained in the catalyst, water formed as by-product during the oxidation reaction and other water incorporated in the solvent during the reaction.

Catalyst

As mentioned hereinabove, the oxidation reaction of this invention is conducted in the presence of a catalyst containing the following three components in specific proportions:

a. a cobalt compound (component A),
b. a manganese compound (component B), and
c. bromine or a bromine compound (component C).

Any of the cobalt compounds and manganese compounds which are soluble in the solvent used for practising this invention, namely acetic acid or an aqueous solution of acetic acid, at temperatures adopted for practising this invention, namely at temperatures ranging from 70° to 170°C., may be used as components (A) and (B).

As the bromine compound (component C) any compounds that can release free bromine in acetic acid or an aqueous solution of acetic acid to be used as the solvent in this invention under the temperature condition for practising the process of this invention, namely at 70° – 170°C can be used.

In the catalyst of this invention, components (A), (B) and (C) are used in proportions meeting the following requirements:

$$3.0 \leq X + Y + Z \leq 10.0 \tag{1}$$

$$0.5 \leq Z/(X + Y) \leq 2.5 \tag{2}$$

and $$0.1 \leq X/Y \leq 10 \tag{3}$$

wherein
- X indicates the amount of cobalt contained in the cobalt compound in terms of parts by weight per 100 parts by weight of mono- or di-methylnaphthalene,
- Y indicates the amount of manganese contained in the manganese compound in terms of parts by weight per 100 parts by weight of mono- or di-methylnaphthalene, and
- Z indicates the amount of the bromine or bromine contained in the bromine compound in terms of parts by weight per 100 parts by weight of mono- or di-methylnaphthalene.

In a preferable embodiment of the catalyst used in this invention, the proportions components (A), (B) and (C) meet the following requirements:

$$3.0 \leq X + Y + Z \leq 8.0 \tag{1'}$$

$$1.0 \leq Z/(X + Y) \leq 2.0 \tag{2'}$$

$$0.2 \leq X/Y \leq 8 \tag{3'}$$

and $$Y \leq 0.3/X \tag{4}$$

wherein X, Y and Z are as defined above.

As is seen from the definitions given to each symbol, the above formula (1) or (1') defines the ratio of the total weight of cobalt, manganese and bromine contained in components (A), (B) and (C) to 100 parts by weight of the mono- and/or di-methylnaphthalene used as the starting material. When the total weight is less than 3.0 parts by weight, the reaction rate is lowered and also the yield of the intended naphthalene mono- or di-naphthalene carboxylic acid is lowered. If the total weight exceeds 8 parts by weight, especially 10 parts by weight, the yield of the intended naphthalene mono- or di-carboxylic acid is rather decreased, and the coloration of the product is accelerated and the reaction operation tends to include various troubles or difficulties.

The formula (2) or (2') defines the weight ratio of bromine in component (C) to the total weight of cobalt and manganese contained in components (A) and (B). When this ratio of $Z/(X + Y)$ is less than 1.0, especially less than 0.5, the yield of the intended naphthalene mono- or di-carboxylic acid is decreased, whereas if the above ratio exceeds 2.0 especially 2.5, not only is the yield of the naphthalene carboxylic acid decreased but also a substitution reaction occurs between the hydrogen atom bonded to the nucleus carbon of the naphthalene ring and the bromine atom in the catalyst, thereby forming naphthalene carboxylic acid bromide. Thus, it is desired in the catalyst of this invention that the above ratio of $Z/(X + Y)$ is within a range defined by the formula (2), especially formula (2').

The formula (3) or (3') defines the weight ratio $(X/Y)$ of cobalt in component (A) to manganese in component (B). When this ratio is lower than 0.2, especially lower than 0.1, or when the ratio exceeds 8, especially 10, the yield of the intended naphthalene mono- or di-carboxylic acid is decreased. Accordingly, it is desired in the catalyst of this invention that the above ratio of $X/Y$ is within a range specified by formula (3), especially formula (3').

Furthermore, in this invention, if components (A) and (B) are used such that the product of X and Y, namely $(X \times Y)$, is 0.3 or more, naphthalene mono- and/or di-carboxylic acid can be obtained at much higher reaction rate and in much higher yield. Accordingly, it is preferred in the catalyst of this invention that the requirement specified by formula (4) is satisfied.

As cobalt compound (component A) and manganese compound (component B) to be used in the catalyst of this invention, cobalt and manganese salts of aliphatic carboxylic acids of one to four carbon atoms such as formic acid, acetic acid, propionic acid, butyric acid, oxalic acid and maleic acid; cobalt and manganese salts of aromatic carboxylic acids such as benzoic acid, phthalic acid, isophthalic acid, terephthalic acid, naphthalene monocarboxylic acid and naphthalene dicarboxylic acid; cobalt and manganese salts of alicyclic carboxylic acids such as naphthenic acid; hydroxides of cobalt and manganese; and inorganic compounds of cobalt and manganese such as oxides of cobalt and manganese; carbonates of cobalt and manganese, basic carbonates of cobalt and manganese, bromides of cobalt and manganese may be cited.

Salts of aliphatic acids and bromides are preferred among the compounds mentioned above. Most preferred examples are cobalt acetate, cobalt bromide, manganese acetate and manganese bromide. These cobalt and manganese compounds may be used in either the anhydrous state or water-containing state.

Cobalt bromide acts as both component (A) and component (C) in the catalyst system used in this invention, and manganese bromide acts as both component (B) and component (C). When only cobalt bromide and manganese bromide are used as components (A), (B) and (C), the proportional relation among cobalt, manganese and bromine to be fed to the reaction system does not satisfy the requirement specified by above formula (2) or (2'). Accordingly, in such case it is necessary to use suitable amounts of compounds of cobalt and/or manganese other than cobalt bromide and manganese bromide (for instance, cobalt acetate and manganese acetate) together with cobalt bromide and manganese bromide and to adjust the proportional relation among these compounds so that X, Y and Z will satisfy the requirements specified by formulas (1), (2) and (3), or (1'), (2'), (3') and (4).

As component (C) of the catalyst of this invention bromine or a bromine compound is used. As the bromine compound hydrogen bromide, metal salts of hydrobromic acid, ammonium bromide, and organic bromine compounds may be mentioned. Examples of the bromine compound to be preferably used in this invention are ammonium bromide ($NH_4Br$), sodium bromide ($NaBr$), potassium bromide ($KBr$), cobalt bromide ($CoBr_2$), manganese bromide ($MnBr_2$), bromoacetic acid, benzyl bromide and bromonaphthalene.

Reaction Conditions

In accordance with the process of this invention, mono- and/or di-methylnaphthalene is oxidized in the above-mentioned specific amount of an acetic acid solvent with molecular oxygen in the presence of the above-mentioned catalyst comprising cobalt, manganese and bromine. In the process of this invention, the reaction temperature is also an important factor, and the reaction is effected at a temperature ranging from 70° to 170°C.

Although the reaction is allowed to advance at temperatures below 70°C., the reaction rate is extremely low, and therefore, adoption of such low reaction temperatures is not preferred from the economical viewpoint. When the reaction is effected at temperatures exceeding 170°C., the ratio of by-products formed by the cleavage of the naphthalene ring such as phthalic acid is increased and the coloration of the resulting naphthalene mono- and/or di-carboxylic acid is extreme. Particularly, at temperatures exceeding 180°C., the ratio of black, carbido-like products is abruptly increased and it is impossible to obtain the intended naphthalene carboxylic acid in high yield. It is preferable that the reaction is conducted at a temperature within a range of from 100° to 160°C. In case 2,6-dimethylnaphthalene is used as the starting material, the reaction temperatures ranging from 130° to 160°C. are especially preferred.

In this invention, it is also essential to conduct the oxidation under pressurized condition such that the partial pressure of oxygen (molecular oxygen) will be at least 0.5 atmosphere (absolute). When the partial pressure of oxygen is lower than 0.5 atmosphere, the yield of the intended naphthalene mono- and/or di-carboxylic acid is decreased. A preferable partial pressure of oxygen is within a range of from 1 to 10 atmospheres, especially from 2 to 8 atmospheres. At an oxygen partial pressure exceeding 10 atmospheres, it is possible to obtain the intended naphthalene carboxylic acid, but the yield of the intended naphthalene carboxylic acid cannot be particularly increased by elevating the oxygen partial pressure above the above upper limit. Accordingly, no particular industrial advantage is attained by maintaining the oxygen partial pressure at a level exceeding 10 atmospheres.

Not only pure oxygen but also a gaseous mixture comprising oxygen and a gas inert to the reaction, such as nitrogen, helium and argon may be used in this invention as source of molecular oxygen. The most readily obtainable, molecular oxygen-containing gas is air, which is used advantageously in the process of this invention.

In practising the process of this invention, mono- and/or dimethylnaphthalene, acetic acid, a cobalt compound, a manganese compound, and bromine or a bromine compound are charged in a reaction vessel, and the mixture is heated at a temperature within the above-mentioned range. Then, molecular oxygen or a gas containing molecular oxygen is blown into the reaction vessel and the reaction is conducted while maintaining the pressure at the prescribed level for a period of time sufficient to obtain the intended naphthalene mono- and/or di-carboxylic acid.

The resulting naphthalene mono- and/or dicarboxylic acid formed by the reaction of this invention can be separated from the reaction mixture by a suitable method. For instance, in the case of naphthalene carboxylic acid, since it is partially or substantially dissolved in acetic acid or a water-containing acetic acid solvent at the end of the reaction, it is recovered by expelling acetic acid and a part or major portion of water from the reaction mixture by evaporation, distillation, flash concentration or the like, cooling the remaining liquor and separating the precipitating naphthalene monocarboxylic acid by filtration or suitable mechanical separation procedure such as centrifugal separation. It is also possible to recover the naphthalene monocarboxylic acid by adding water to the remaining liquor resulting from the removal of acetic acid and water, to thereby precipitate the naphthalene monocarboxylic acid, and separating the precipitate by the above-mentioned separation procedure.

Since naphthalene dicaraboxylic acid has a lower solubility in acetic acid or aqueous acid than naphthalene monocarboxylic acid, a majority of the resulting naphthalene dicarboxylic acid is precipitated only by cooling the reaction mixture. Thus, the intended product can be readily recovered by separating the precipitate by any of the above-mentioned separation procedures such as filtration and centrifugal separation.

2,6-naphthalene dicarboxylic acid is not appreciably soluble even in hot acetic acid. Accordingly, when 2,6-naphthalene dicarboxylic acid is separated from the reaction mixture still maintained at high temperatures by filtration, centrifugal separation or other known separation technique, it is readily recovered in the form free from by-products soluble in acetic acid.

The so recovered naphthalene mono- and/or dicarboxylic acid is used for various purposes as it is or after further purification.

The process of this invention may be conducted either continuously or batchwise. Molecular oxygen or a gas containing molecular oxygen may be allowed to contact the starting material either in a concurrent manner or in a parallel current manner.

In the process of this invention, it is possible to recycle the unreacted starting material, intermediate oxidation product, catalyst and the like by removing water and the resulting naphthalene mono- and/or dicarboxylic acid from the reaction mixture, and subjecting the remaining mother liquor to the oxidation step again.

The above-mentioned process of this invention can give naphthalene mono- and/or di-carboxylic acid of less coloration at a high reaction rate in extremely high yield, though all of the conventional methods cannot prepare naphthalene mono- and/or di-carboxylic acid in good yields.

This invention will now be detailed by referring to Examples, in which "parts" means "parts by weight" unless otherwise indicated.

EXAMPLE 1

A pressure vessel composed of titanium and equipped with a gasblowing tube and a stirrer was charged with 20 parts of 1,4-dimethylnaphthalene, 200 parts of glacial acetic acid, 1 part of cobalt acetate tetrahydrate, 1 part of manganese acetate tetrahydrate and 1 part of potassium bromide. While the temperature and pressure were being maintained at 115°C. and 30 kg/cm² gauge, compressed air was introduced at a rate, calculated as the oxygen feed rate, of 20 parts per hour. The reaction was allowed to occur coincidentally with the initiation of introduction of compressed air. In about one hour, the reaction was almost completed and absorption of oxygen was not appreciably observed. The introduction of compressed air was continued for an additional 30 minutes, and then the reaction mixture was taken out and a majority of acetic acid was removed therefrom by distillation. Then, 300 parts of water and 10 parts of 6 N hydrochloric acid were added to the residue and the mixture was heated under reflux for about one hour to dissolve compounds of cobalt, manganese and bromine, following which the mixture was cooled to form precipitates. The precipitates were recovered by filtration, washed sufficiently with water, and dried to yield 23.9 parts of a solid product which was identified to be 1,4-naphthalene dicarboxylic acid by analysis. The yield of the resulting 1,4-naphthalene dicarboxylic acid was 86.2 mole percent. In this Example, the value of $(X + Y + Z)$ was 5.67 the value of $Z/(X + Y)$ being 1.45 and the value of $X/Y$ being 1.06.

COMPARATIVE EXAMPLE 1

The reaction was carried out in the same manner as in Example 1 by employing 2 parts of cobalt acetate tetrahydrate instead of 1 part of cobalt acetate tetrahydrate and 1 part of manganese acetate tetrahydrate. The absorption of oxygen was very slow, and when 8 hours had passed from the initiation of introduction of compressed air, the reaction was stopped and the reaction mixture was analyzed to find that the yield of 1,4-naphthalene dicarboxylic acid was only 55.3 mole percent. In this run, the value of $(X + Y + Z)$ was 5.72, the value of $Z/(X + Y)$ was 1.42 and the value of $X/Y$ was $\infty$.

Example 1 was repeated by employing 2 parts of manganese acetate tetrahydrate without use of cobalt acetate tetrahydrate, and the reaction was continued for 8 hours. The yield of 1,4-naphthalene dicarboxylic acid was 34.8 percent. In this run, the value of $(X + Y + Z)$ was 5.60, the value of $Z/(X + Y)$ being 1.50 and the value of $X/Y$ being zero.

EXAMPLES 2–5 AND COMPARATIVE EXAMPLE 2

The same reaction vessel as used in Example 1 was charged with 20 parts of a dimethylnaphthalene mixture the dimethylnaphthalene content was 81.0 percent by weight, 200 parts of glacial acetic acid, 1 part of cobalt acetate tetrahydrate, 1 part of manganese acetate tetrahydrate and 1 part of ammonium bromide. The mixture was heated to a reaction temperature indicated in Table 1, and the reaction was conducted under a pressure of 30 kg/cm² gauge while introducing compressed air at the same rate as in Example 1. The reaction was generally continued until absorption of oxygen was not observed. After completion of the reaction, the reaction mixture was subjected to the separation treatment in the same manner as in Example 1. Results of the analysis are shown in Table 1. In these runs, the value of $(X + Y + Z)$ was 6.38, the value of $Z/(X + Y)$ being 1.77 and the value of $X/Y$ being 1.06.

Table 1

| | Reaction temperature (°C.) | Reaction time (hr) | Yield of naphthalene dicarboxylic acid (mole %) |
|---|---|---|---|
| Example 2 | 80 | 4.5 | 76.5 |
| Example 3 | 100 | 3 | 80.5 |
| Example 4 | 120 | 2 | 73.4 |
| Example 5 | 150 | 2 | 72.5 |
| Comparative Example 2 | 180 | 2 | 40.6 |

Table 2

| | Reaction pressure (kg/cm² gauge) | Reaction time (hr) | Yield of naphthalene dicarboxylic acid (mole %) |
|---|---|---|---|
| Example 6 | 30 | 2 | 81.6 |
| Example 7 | 5 | 3 | 68.4 |
| Comparative Example 3 | 1 | 6 | 14.6 |

EXAMPLE 8 - 14 AND COMPARATIVE EXAMPLES 4 AND 5

The same reaction vessel as used in Example 1 was charged with 20 parts of 2,6-dimethylnaphthalene, 300 parts of glacial acetic acid and compounds of cobalt, manganese and bromine indicated in Table 3. The reaction was carried out at 150°C. and under a pressure of 30 kg/cm² gauge while introducing compressed gas at the same rate as in Example 1. After completion of the reaction, the reaction mixture was cooled and precipitates were recovered by filtration. The precipitates were washed with 200 parts of glacial acetic acid, dried and analyzed. Results are shown in Table 3. The optical density of the product obtained in each run is shown in Table 3. The optical density was determined by dissolving 0.1 g of the sample into 25 percent aqueous solution of methylamine to form 10 cc of a solution, and measuring the intensity of a cell thickness of 1 cm at a wavelength of 500 m$\mu$ by a spectrophotometer. The measurement of the optical density is the same in examples which follow.

Table 3

| | Cobalt compound (part) | Manganese compound (part) | Bromine compound (part) | Value of X+Y+Z | Value of Z/(X+Y) | Value of X/Y | Reaction time (hr) | Yield (mole %) | Optical density |
|---|---|---|---|---|---|---|---|---|---|
| Ex. 8 | Co(OAc)₂.4H₂O (0.5) | Mn(OAc)₂.4H₂O (1.5) | 50% aqueous HBr (1.6) | 5.48 | 1.41 | 0.35 | 2 | 84.3 | 0.106 |
| Ex. 9 | Co(OAc)₂.4H₂O (1.5) | Mn(OAc)₂.4H₂O (0.5) | 50% aqueous HBr (1.6) | 5.55 | 1.37 | 3.16 | 2 | 82.8 | 0.124 |
| Ex. 10 | Co(OAc)₂.4H₂O (0.5) | Mn(OAc)₂.4H₂O (1.0) | 50% aqueous HBr (1.6) | 4.13 | 1.44 | 0.53 | 2 | 83.1 | 0.160 |
| Ex. 11 | Co(OAc)₂.4H₂O (1.0) | Mn(OAc)₂.4H₂O (2.0) | 50% aqueous HBr (2.0) | 8.36 | 1.44 | 0.53 | 2 | 78.3 | 0.188 |
| Comp. Ex. 4 | Co(OAc)₂.4H₂O (2.0) | Mn(OAc)₂.4H₂O (3.0) | 50% aqueous HBr (3.2) | 13.64 | 1.38 | 0.70 | 2 | 69.7 | 0.86 |
| Comp. Ex. 5 | Co(OAc)₂.4H₂O (0.3) | Mn(OAc₂.4H₂O (0.5) | 50% aqueous HBr (1.6) | 2.16 | 1.35 | 0.63 | 3 | 64.3 | 0.61 |
| Ex. 12 | CoCO₃ (0.5) | MnCO₃ (1.0) | NaBr (1.0) | 7.51 | 1.07 | 0.52 | 2 | 86.2 | 0.102 |
| Ex. 13 | CoBr₂ (1.0) | Mn(OAc)₂.4H₂O (1.0) | not added | 6.12 | 1.20 | 1.20 | 2 | 83.0 | 0.122 |
| Ex. 14 | Co(C₂H₃COO)₂ (0.5) | MnBr₂ (1.5) | not added | 7.21 | 1.38 | 1.11 | 2 | 80.6 | 0.152 |

EXAMPLES 6 AND 7 AND COMPARATIVE EXAMPLE 3

The same reaction vessel as used in Example 1 was charged with 20 parts of the same dimethylnaphthalene mixture as used in Example 2, 200 parts of glacial acetic acid, 1 part of cobalt acetate tetrahydrate, 1 part of manganese acetate tetrahydrate and 1 part of ammonium bromide. The reaction was conducted at 115°C. and under a pressure indicated in Table 2, while introducing compressed air at the same rate as in Example 1. After completion of the reaction, the reaction mixture was subjected to the separation treatment in the same manner as in Example 1. Results of the analysis are shown in Table 2.

EXAMPLES 15 – 17 AND COMPARATIVE EXAMPLE 6

The same reaction vessel as used in Example 1 was charged with 20 parts of 2,6-dimethylnaphthalene, 300 parts of glacial acetic acid, 1.0 part of cobalt acetate tetrahydrate, 1.0 part of manganese acetate tetrahydrate and 1.6 parts of 50 percent aqueous hydrobromic acid, and the mixture was heated at a temperature indicated in Table 4 and the reaction was conducted under a pressure of 30 kg/cm² gauge while introducing compressed air at the same rate as in Example 1. After completion of the reaction, the reaction mixture was cooled, and the precipitates were recovered by filtration, washed with 200 parts of glacial acetic acid, dried and analyzed. Results are shown in Table 4. In each run, the value of $(X + Y + Z)$ was 6.82, the value of $Z/(X + Y)$ being 1.38 and the value of $X/Y$ being 0.70.

Table 4

|  | Reaction temperature (°C.) | Reaction time (hr) | Yield of 2,6-naphthalene dicarboxylic acid (mole %) | Optical density of 2,6-naphthalene dicarboxylic acid |
|---|---|---|---|---|
| Example 15 | 110 | 3 | 74.1 | 0.061 |
| Example 16 | 130 | 2 | 80.9 | 0.064 |
| Example 17 | 150 | 2 | 86.3 | 0.098 |
| Comparative Example 6 | 180 | 2 | 68.4 | 1.34 |

Table 6

|  | Example 20 | Comparative Example 8 | Comparative Example 9 |
|---|---|---|---|
| Amount added of ammonium bromide (part) | 0.5 | 5 | 0 |
| Value of (X + Y + Z) | 4.34 | 22.7 | 2.30 |
| Value of Z/(X + Y) | 0.89 | 8.85 | 0 |
| Value of X/Y | 1.06 | 1.06 | 1.06 |
| Reaction time (hr) | 2.5 | 3 | 2 |
| Yield of naphthalene dicarboxylic acid (mole %) | 68.2 | 33.4 | 0 |

EXAMPLES 18 AND 19 AND COMPARATIVE EXAMPLE 7

The same dimethylnaphthalene as used in Example 2 was oxidized. A mixture of the dimethylnaphthalene, glacial acetic acid, cobalt acetate tetrahydrate, manganese acetate tetrahydrate and ammonium bromide in amounts indicated in Table 5 was charged in the same vessel as used in Example 1, and the reaction was carried out at 115°C. and under 30 kg/cm² gauge while introducing compressed air at a rate of 5 parts per hour per part of dimethylnaphthalene feed. After completion of the reaction, the reaction mixture was subjected to the separation treatment in the same manner as in Example 1. Results of the analysis are shown in Table 5.

Table 5

|  | Example 18 | Example 19 | Comparative Example 7 |
|---|---|---|---|
| Charge (part) |  |  |  |
| Mixed dimethyl-naphthalene | 20 | 30 | 50 |
| Glacial acetic acid | 100 | 100 | 100 |
| Cobalt acetate tetrahydrate | 1 | 1.5 | 2.5 |
| Manganese acetate tetrahydrate | 1 | 1.5 | 2.5 |
| Ammonium bromide | 1 | 1.5 | 2.5 |
| Reaction time (hr) | 2 | 2.5 | 2 |
| Value of X + Y + Z | 5.67 | 5.67 | 5.67 |
| Value of Z/(X + Y) | 1.45 | 1.45 | 1.45 |
| Value of X/Y | 1.06 | 1.06 | 1.06 |
| Yield of naphthalene dicarboxylic acid (mole %) | 72.5 | 66.1 | 22.2 |

EXAMPLE 20 AND COMPARATIVE EXAMPLES 8 AND 9

The same reaction vessel as used in Example 1 was charged with a mixed solution of 20 parts of the same dimethylnaphthalene mixture as used in Example 2, 200 parts of glacial acetic acid, 1 parts of cobalt acetate tetrahydrate and 1 part of manganese acetate tetrahydrate, and ammonium bromide in an amount indicated in Table 6 was added to the mixed solution. The reaction was effected at 115°C. and under a pressure of 30 kg/cm² gauge while introducing compressed air at the same rate as in Example 1. The product was separated in the same manner as in Example 1 and analyzed. Results of the analysis are shown in Table 6.

EXAMPLE 21

A pressure vessel composed of titanium and equipped with a gasblowing tube and a stirrer was charged with 20 parts of 1-methylnaphthalene, 200 parts of glacial acetic acid, 0.6 part of cobalt acetate tetrahydrate, 0.6 part of manganese acetate tetrahydrate, and 0.5 part of ammonium bromide. While the temperature and pressure of the mixture were being maintained at 115°C. and 20 kg/cm² gauge, respectively, compressed air was introduced into the reaction vessel at such a rate that oxygen was fed at a rate of 5 moles per hour per mole of the methylnaphthalene.

The reaction occurred coincidentally with the initiation of introduction of compressed air, and about 20 minutes later, the reaction was almost completed and absorption of oxygen was no longer observed. Then, the introduction of compressed air was continued for an additional 30 minutes and the majority of acetic acid was removed by distillation, following which 200 parts of water and 5 parts of 6 N hydrochloric acid were added to the residue and the mixture was heated under reflux for about 1 hour to dissolve compounds of cobalt, manganese and bromine. Then, the mixture was cooled to form precipitates, which were then separated by filtration, washed sufficiently with water, dried and analyzed. Thus it was found that 22.3 parts of 1-naphthonic acid of a purity of 98.5 percent by weight were obtained. The yield of the resulting 1-naphthonic acid was 91.5 mole percent based on the charged 1-methylnaphthalene. In this Example, the value of (X + Y + Z) was 3.42, the value of Z/(X + Y) being 1.47 and the value of X/Y being 1.06.

EXAMPLE 22

The reaction was conducted under the same conditions as in Example 21 by employing 2-methylnaphthalene instead of 1-methylnaphthalene. As a result, 2-naphthonic acid was obtained in a yield of 90.6 mole percent.

COMPARATIVE EXAMPLE 10

The same reaction vessel as used in Example 21 was charged with 20 parts of 1-methylnaphthalene, 200 parts of glacial acetic acid, 1.2 parts of cobalt acetate tetrahydrate, and 0.5 part of ammonium bromide, and the reaction was effected at 115°C. and under a pressure of 20 kg/cm² gauge while introducing compressed air at the same rate as in Example 21. The advance of the reaction was slow, and absorption of oxygen was observed for about 2 hours from the initiation of the reaction. When 3 hours had passed from the initiation of the introduction of compressed air, the reaction mixture was taken out and separated in the same manner as in Example 21. As the result of the analysis of the product, it was found that 1-naphthonic acid was formed in a yield of only 38.5 mole percent based on the charged methylnaphthalene. In this run, the value of (X + Y + Z) was 3.46, the value of Z/(X + Y) being 1.44 and the value of X/Y being ∞.

The above run was repeated by employing 1.2 parts of manganese acetate tetrahydrate instead of 1.2 parts of cobalt acetate tetrahydrate, and the reaction was continued for 3 hours. As a result, 1-naphthonic acid was obtained in a yield of 20.8 mole percent. In this run, the value of (X + Y + Z) was 3.39, the value of Z/(X + Y) being 1.52 and the value of X/Y being zero.

EXAMPLES 23 – 25 AND COMPARATIVE EXAMPLE 11

The same reactor as used in Example 21 was charged with 20 parts of 1-methylnaphthalene, 200 parts of glacial acetic acid, 0.6 part of cobalt acetate tetrahydrate, 0.6 part of manganese acetate tetrahydrate and 0.5 part of ammonium bromide, and the mixture was heated at a temperature indicated in Table 7. The reaction was conducted under a pressure of 20 kg/cm² gauge while introducing compressed air at the same rate as in Example 21. The reaction product was separated in the same manner as in Example 21. Results of the analysis are shown in Table 7. In each run, the value of (X + Y + Z) was 3.42, the value of Z/(X + Y) being 1.47 and the value of X/Y being 1.06.

Table 7

|  | Reaction temperature (°C.) | Reaction time (hr) | Yield of naphthoic acid (mole %) |
|---|---|---|---|
| Example 23 | 80 | 2.0 | 72.4 |
| Example 24 | 100 | 1.5 | 91.0 |
| Example 25 | 150 | 1.0 | 80.6 |
| Comparative Example 11 | 180 | 1.0 | 64.7 |

EXAMPLES 26 – 31 AND COMPARATIVE EXAMPLES 12 - 16

The same reaction vessel as used in Example 21 was charged with 20 parts of 1-methylnaphthalene, 200 parts of glacial acetic acid, and amounts indicated in Table 8 of cobalt acetate tetrahydrate, manganese acetate tetrahydrate and ammonium bromide. The reaction was carried out at 115°C. under a pressure of 20 kg/cm² gauge while introducing compressed air at the same rate as in Example 21. The reaction was continued until absorption of oxygen was not appreciably observed.

After completion of the reaction, the reaction product obtained in each run was separated in the same manner as in Example 21 and analyzed. Results of the analysis are shown in Table 8.

Table 8

| | Catalyst component charge (part) | | | | | | | |
|---|---|---|---|---|---|---|---|---|
| | Cobalt acetate tetrahydrate | Manganese acetate tetrahydrate | Ammonium bromide | Reaction time (hr) | Value of X+Y+Z | Value of Z/(X+Y) | Value of X/Y | Yield of naphthonic acid (mole %) |
| Example 26 | 1.2 | 1.2 | 1.0 | 1 | 6.85 | 1.47 | 1.06 | 92.1 |
| Example 27 | 1.2 | 0.6 | 0.7 | 1 | 4.95 | 1.36 | 2.11 | 92.3 |
| Example 28 | 1.2 | 0.3 | 0.5 | 1 | 3.80 | 1.16 | 4.23 | 88.4 |
| Comparative Example 12 | 1.2 | 0.02 | 0.5 | 3 | 3.48 | 1.41 | 63.40 | 58.8 |
| Example 29 | 0.6 | 1.2 | 0.7 | 1 | 4.91 | 1.39 | 0.53 | 91.8 |
| Example 30 | 0.2 | 1.2 | 0.5 | 1 | 3.61 | 1.29 | 0.18 | 88.8 |
| Comparative Example 13 | 0.02 | 1.2 | 0.5 | 3 | 3.41 | 1.49 | 0.02 | 40.2 |
| Comparative Example 14 | 0.2 | 0.2 | 0.2 | 3 | 1.28 | 1.77 | 1.06 | 48.4 |
| Example 31 | 1.2 | 1.2 | 0.5 | 1 | 4.81 | 0.74 | 1.06 | 90.4 |
| Comparative Example 15 | 1.2 | 1.2 | 0.1 | 2 | 3.17 | 0.07 | 1.06 | 68.0 |
| Comparative Example 16 | 0.1 | 0.1 | 1.0 | 5 | 4.31 | 17.73 | 1.06 | 40.6 |

EXAMPLE 32

The same rector as used in Example 21 was charged with 20 parts of 1-methylnaphthalene, 200 parts of glacial acetic acid, 0.6 part of cobalt acetate tetrahydrate, 1.2 parts of manganese acetate tetrahydrate and 1.5 parts of 1-bromonaphthalene, and the reaction was conducted at 130°C. and 20 kg/cm² gauge while introducing compressed air at the same rate as in Example 21.

After completion of the reaction, the reaction mixture was subjected to the separation treatment in the same manner as in Example 21 and analyzed. As a result, it was found that naphthonic acid was obtained in a yield of 86.8 percent. In this Example, the value of (X + Y + Z) was 4.96, the value of Z/(X + Y) was 1.41 and the value of X/Y was 0.53.

EXAMPLE 33

The same reaction vessel as used in Example 1 was charged with 20 parts of a methylnaphthalene mixture of the following composition obtained by fractional distillation of coal tar, 200 parts of glacial acetic acid, 1 part of cobalt acetate tetrahydrate, 1 part of manganese acetate tetrahydrate and 1 part of ammonium bromide. The reaction was conducted at 130°C. and 30 kg/cm² gauge for 2 hours while introducing compressed air at the same rate as in Example 1.

| | % by weight |
|---|---|
| 2-methylnaphthalene | 5.3 |
| 1-methylnaphthalene | 6.9 |
| biphenyl | 1.5 |
| 2-ethylnaphthalene | 6.3 |
| 1-ethylnaphthalene | 3.1 |
| 2,6-dimethylnaphthalene | 12.2 |
| 2,7-dimethylnaphthalene | 10.2 |
| 1,7-dimethylnaphthalene | 11.0 |
| 1,6-dimethylnaphthalene | 14.8 |
| 1,3-dimethylnaphthalene | 10.6 |
| 1,5-dimethylnaphthalene | 1.0 |
| 2,3-dimethylnaphthalene | 2.0 |
| 1,4-dimethylnaphthalene | 1.6 |
| acenaphthene | 4.2 |
| other compounds | 9.3 |

After completion of the reaction, the reaction mixture was analyzed to obtain the following results.

| Recovered naphthalene carboxylic acid | Amount (part) |
|---|---|
| 2-naphthonic acid | 2.2 |
| 1-naphthonic acid | 2.1 |
| 2,6-naphthalene dicarboxylic acid | 2.6 |
| other naphthalene dicarboxylic acids | 11.1 |

EXAMPLES 34 – 37

The same reaction vessel as used in Example 1 was charged with 20 parts of 2,6-dimethylnaphthalene, 300 parts of glacial acetic acid and amounts indicated in Table 9 of manganese acetate tetrahydrate in the amounts indicated in Table 9, a cobalt compound indicated in Table 9 and sodium bromide or bromine. The mixture was heated at 150°C. and compressed air was introduced into the vessel so as to maintain the pressure at 30 kg/cm² gauge. Under these conditions the reaction was continued for 2 hours, after completion of the reaction, the reaction mixture was subjected to the separation treatment in the same manner as in Example 1 and analyzed. Results are shown in Table 9.

Table 9

| | Example 34 | Example 35 | Example 36 | Example 37 |
|---|---|---|---|---|
| Cobalt compound kind | Co(OH)$_2$ | cobalt naphthoate | cobalt oxalate | Co(OAc)$_2$.4H$_2$O |
| amount (part) | 0.5 | 1.0 | 0.7 | 1.0 |
| Amount of manganese tetrahydrate (part) | 1.0 | 1.0 | 1.0 | 1.5 |
| Bromine component kind | NaBr | NaBr | NaBr | Br$_2$ |
| amount (part) | 1.0 | 1.0 | 1.0 | 0.8 |
| Value of X + Y + Z | 6.58 | 5.74 | 6.40 | 6.86 |
| Value of Z/(X + Y) | 1.43 | 2.08 | 1.54 | 1.40 |
| Value of X/Y | 1.41 | 0.66 | 1.25 | 0.70 |
| Yield of 2,6-naphthalene dicarboxylic acid (mole %) | 83.4 | 84.1 | 80.2 | 83.1 |
| Optical density | 0.121 | 0.108 | 0.134 | 0.144 |

EXAMPLE 38

The same reaction vessel as used in Example 1 was charged with 20 parts of 2,6-dimethylnaphthalene, 200 parts of acetic acid containing 0.5 percent by weight of water, 1 part of cobalt acetate tetrahydrate, 1.5 parts of manganese acetate tetrahydrate, and 1.6 parts of hydrobromic acid of a concentration of 50 percent by weight. The mixture was heated at 150°C. and compressed air was introduced into the reaction vessel while maintaining the pressure at 30 kg/cm² gauge. The reaction was carried out under these conditions for 2 hours. After completion of the reaction, the reaction mixture was subjected to the separation treatment in the same manner as in Example 1, and analyzed. As a result, it was found that the yield of 2,6-naphthalene dicarboxylic acid was 86.1 mole percent and the optical density of the product was 0.125. It was also found that the water content of the reaction mixture was 3.7 percent by weight. In this Example, the value of (X + Y + Z) was 6.82, the value of Z/(X + Y) being 1.38 and the value of X/Y being 0.70.

What we claim is:

1. A process for the preparation of naphthalene dicarboxylic acid which consists essentially of oxidizing dimethylnaphthalene with molecular oxygen at a temperature within a range of from 100° to 160°C. under an oxygen partial pressure of from 2 to 8 atmospheres (absolute pressure) in acetic acid of an amount of at least 4 parts by weight per part by weight of dimethylnaphthalene in the presence of a catalyst consisting essentially of the following three components:
   a. a cobalt compound soluble in said acetic acid under reaction conditions;
   b. a manganese compound soluble in said acetic acid under reaction conditions; and
   c. bromine or a bomine compound; in quantities meeting the following requirements:

$$3.0 \leq X + Y + Z \leq 8.0 \quad (1)$$
$$1.0 \leq Z/(X + Y) \leq 2.0 \quad (2)$$
$$0.2 \leq X/Y \leq 8 \quad (3)$$

wherein

X represents the amount of cobalt contained in said cobalt compound in terms of parts by weight per 100 parts by weight of dimethylnaphthalene, Y represents the amount of manganese contained in said manganese compound in terms of parts by weight per 100 parts of dimethylnaphthalene, and Z represents the amount of the bromine contained in said bromine or bromine compound in terms of parts by weight per 100 parts by weight of dymethylnaphthalene.

2. The process of claim 1, wherein 2,6-dimethylnaphthalene is oxidized with molecular oxygen at a temperature of from 130° to 160°C.

3. The process of claim 1 wherein the oxidation is carried out in the presence of a catalyst meeting the additional requirement of:

$$Y \geq 0.3/X;$$

wherein Y and X are as defined in claim 1.

4. The process of claim 1 wherein said acetic acid contains up to 10 percent by weight of water.

5. The process of claim 1 wherein said acetic acid contains from about 0.5 to about 5.0 percent by weight of water.

* * * * *